(12) United States Patent
Hoobler, III et al.

(10) Patent No.: US 8,738,873 B2
(45) Date of Patent: May 27, 2014

(54) INTERFACING WITH A POINT-IN-TIME COPY SERVICE ARCHITECTURE

(75) Inventors: Dilbert B. Hoobler, III, Horseheads, NY (US); Grigore-Antonius Ionescu, Bucharest (RO)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 13/166,803

(22) Filed: Jun. 22, 2011

(65) Prior Publication Data
US 2012/0331247 A1  Dec. 27, 2012

(51) Int. Cl.
*G06F 12/00*  (2006.01)
(52) U.S. Cl.
USPC .................................. 711/162; 711/E12.103
(58) Field of Classification Search
None
See application file for complete search history.

(56) References Cited

U.S. PATENT DOCUMENTS

| | | | | |
|---|---|---|---|---|
| 5,742,792 | A * | 4/1998 | Yanai et al. | 711/162 |
| 5,857,208 | A * | 1/1999 | Ofek | 707/999.202 |
| 6,735,636 | B1 * | 5/2004 | Mokryn et al. | 710/5 |
| 6,948,038 | B2 | 9/2005 | Berkowitz et al. | |
| 7,237,080 | B2 * | 6/2007 | Green et al. | 711/162 |
| 7,321,962 | B1 | 1/2008 | Fair et al. | |
| 7,389,394 | B1 * | 6/2008 | Karr et al. | 711/162 |
| 7,523,278 | B2 | 4/2009 | Thompson et al. | |
| 7,549,028 | B2 | 6/2009 | Thompson et al. | |
| 7,606,844 | B2 * | 10/2009 | Kottomtharayil | 1/1 |
| 7,685,175 | B2 * | 3/2010 | Carroll et al. | 707/661 |
| 7,702,867 | B2 * | 4/2010 | Coombs et al. | 711/162 |
| 7,711,913 | B1 * | 5/2010 | Moody et al. | 711/162 |
| 2008/0222373 | A1 | 9/2008 | Garimella | |

OTHER PUBLICATIONS

Margaret Rouse, "Exit Program", Sep. 2005, pp. 1-15, http://search400.techtarget.com/definition/exit-program.*
William D. Walsh, "Quiesce", Apr. 2005, pp. 1-12, http://whatis.techtarget.com/definition/quiesce.*
Hoobler et al. "Using Tivoli Storage Manager for Performing VSS Operations", (online), Jan. 12, 2009, (retrieved from the internet May 3, 2011). Retrieved from the Internet at <URL://http:www.ibm.com/developerworks/tivoli/library/t-tsm-vss/index.html, 11 pgs.

(Continued)

*Primary Examiner* — Edward Dudek, Jr.
*Assistant Examiner* — Christopher Birkhimer
(74) *Attorney, Agent, or Firm* — David W. Victor; Konrad, Raynes, Davda and Victor LLP

(57) ABSTRACT

Provided are a computer program product, system, and method for interfacing with point-in-time copy service architecture to create a point-in-time copy of a volume in a storage used by an application. A point-in-time copy request is processed to perform a point-in-time copy with respect to the volume in the storage, wherein the request indicates at least one exit, wherein the exit indicates when the exit is to be invoked with respect to an operation of the point-in-time copy and indicates a location of an executable object to execute when the exit is invoked. Communicating with the point-in-time copy service to prepare for the point-in-time copy. For each exit, determining from the exit when to invoke the exit and executing the executable object for the exit to invoke to perform operations related to the point-in-time copy. The point-in-time copy service is called to perform the point-in-time copy operation of the volume.

20 Claims, 5 Drawing Sheets

(56) References Cited

OTHER PUBLICATIONS

IBM, "Maximize the Availability of Health Data While Minimizing Storage Costs", IBM Corporation Software Group, Aug. 2010, 4 pgs.
IBM, "IBM Tivoli Storage FlashCopy Manager", IBM Corporation Software Group, Nov. 2010, 6 pgs.
IBM, "Tivoli Storage FlashCopy Manager" (online), (retrieved from the Internet May 29, 2011). Retrieved from the Internet at <URL : http://www.-01.ibm.com/software/tivoli/products/storage-flashcopy-mgr/, 1pg.
IBM, "How VSS Works with Tivoli Storage Manager for Copy Server and IBM System Hardware", (online), (Retrieved from the Internet May 29, 2011). Retrieved from the Internet at <URL: http://www.redbooks.ibm.com/abstracts/tips0638.html?Open, 2 pgs.
Microsoft, "How Volume Shadow Copy Service Works", (online), 2011, (Retrieved from the Internet May 29, 2011, dated Mar. 28, 2003). Retrieved from the Internet at <URL: http://www.technet.microsoft.com/en-us/library/cc785914 (WS.10,printer).aspx, 7pgs.
H. Burose, "Data Protector: What's New", HP Software Universe, 2009, 35 pgs.
"3PAR Recovery Manager for SQL Server and Exchange Simple and Efficient Snapshot Management", 3PAR Serving Information, 2008, 21 pgs.
"Eight Ways an iSCSI SAN Simplifies Life for Microsoft Windows System Administrators", LeftHand Networks Inc., 2004, 13 pgs.
L. Whitehouse, "Addressing the Top Data Protection Challenges in Mixed Physical and Virtual Server Environments: Symantec Backup and Recovery Solutions for Physical and Virtual Servers", The Enterprise Strategy Group Inc., Feb. 2009, 11 pgs.
P. Mell, "THe NIST Definition of Cloud Computing (Draft)", National Institute of Standards and Technology, Special Publication 800-145 (draft), Jan. 2011, pp. 1-7.

\* cited by examiner

Point-in-Time Copy Request

Exit

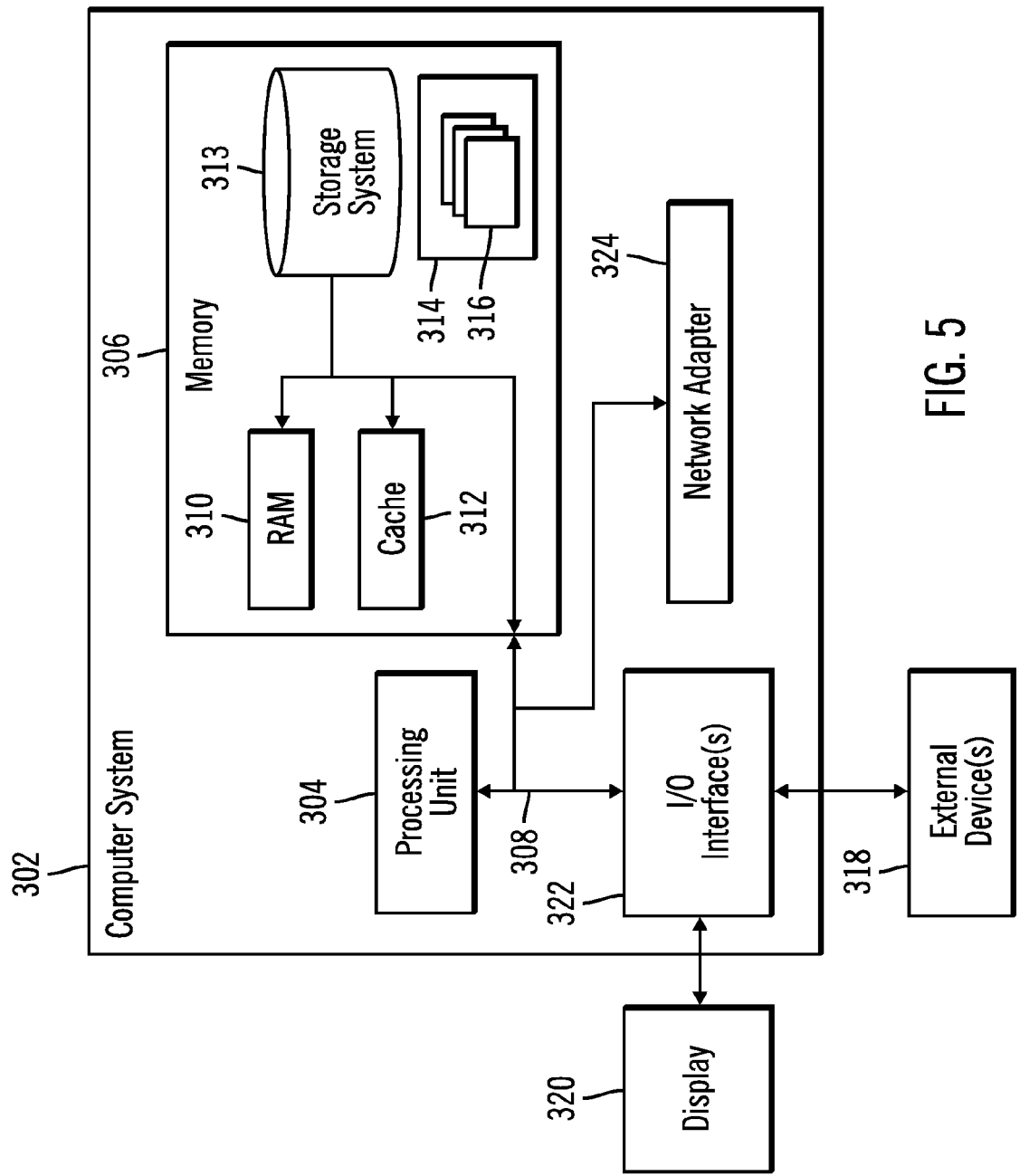

US 8,738,873 B2

INTERFACING WITH A POINT-IN-TIME COPY SERVICE ARCHITECTURE

BACKGROUND OF THE INVENTION

1. Field of the Invention

The present invention relates to a computer program product, system, and method for interfacing with point-in-time copy service architectures.

2. Description of the Related Art

Certain backup programs create a logical copy of a volume, which is created almost instantaneously, to avoid the data being off-line for an extended period. A logical copy operation may take just a few seconds to establish a copy relationship between a source volume and a point-in-time target volume. After establishing the logical copy, source volume data subject to an update is copied to a target volume so that the target volume has the data as of the point-in-time the logical copy was established, before the update. This defers the physical copying until an update is received. This logical copy operation is performed to minimize the time during which the source volumes are inaccessible. The point-in-time copy comprises the combination of the data in the source volume and the data to be overwritten by the updates Certain providers of backup services that create a logical point-in-time copy require that users create specialized components to interact with their copy services. For instance, MICROSOFT® provides a point-in-time copy service called Volume Shadow Copy (VSS) that creates snapshot copies of volumes, and provides for very fast backup and restore. (MICROSOFT is a trademark if Microsoft Corporation registered in many jurisdictions worldwide). Microsoft's VSS infrastructure requires that application vendors implement a "VSS writer" to fully integrate with VSS. Implementing a VSS Writer can be a large undertaking for application vendors. Thus, some applications do not have a VSS Writer.

There is a need in the art for improved techniques for leveraging and using third part backup services.

SUMMARY

Provided are a computer program product, system, and method for interfacing with point-in-time copy service architecture to create a point-in-time copy of a volume in a storage used by an application. A point-in-time copy request is processed to perform a point-in-time copy with respect to the volume in the storage, wherein the request indicates at least one exit, wherein the exit indicates when the exit is to be invoked with respect to an operation of the point-in-time copy and indicates a location of an executable object to execute when the exit is invoked. Communicating with the point-in-time copy service to prepare for the point-in-time copy. For each exit, determining from the exit when to invoke the exit and executing the executable object for the exit to invoke to perform operations related to the point-in-time copy. The point-in-time copy service is called to perform the point-in-time copy operation of the volume.

BRIEF DESCRIPTION OF THE DRAWINGS

FIG. 5 illustrates an embodiment of a computing environment.

DETAILED DESCRIPTION

Application users may want to interact with third party point-in-time copy service programs without having to create the software programs needed to interact with all the utilities of the point-in-time copy service. Described embodiments provide a program component in the form of a requestor to access a point-in-time copy service to make point-in-time copies on behalf of an application so the application user or vendor does not have to create all the necessary components, such as a writer, to utilize the point-in-time copy service. With the described embodiments, the application user/vendor may provide post and pre-copy exits to ready the application for the point-in-time copy managed by the third party point-in-time copy service and return the application to a state of normal operations after the copy. The requestor program then handles the invocation of the pre-copy and post-copy exits and interaction with the point-in-time copy service to create point-in-time copies for the application data.

Figure 1:
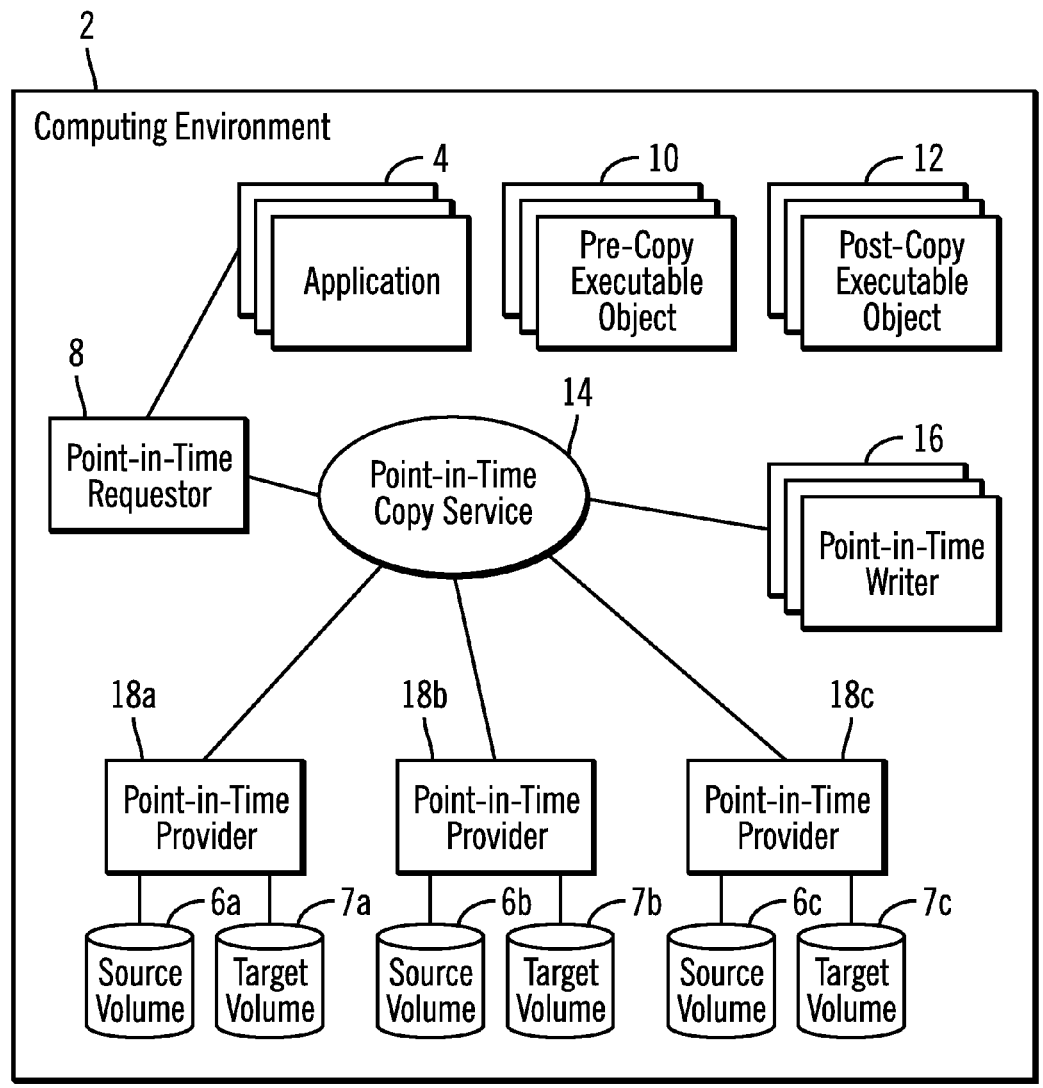
FIG. 1 illustrates an embodiment of a computing environment.

FIG. 1 illustrates an embodiment of a computing environment 2 for providing point-in-time backup services for one or more applications 4 performing read and write requests with respect to volumes 6a, 6b, 6c. A point-in-time requestor 8 initiates a backup to create point-in-time copies of volumes used by the requesting application 4, which result in the target volumes 7a, 7b, 7c, which comprise the point-in-time copies for the application source volumes 6a, 6b, 6c, respectively. A user may schedule the requestor 8 to initiate point-in-time copies of the volumes. A user of the applications 4 may create exits associated with executable objects, such as commands or programs, that are executed at specified execution points during the creation of the point-in-time copy. An executable object may comprise a command, a script program, batch program, etc. In certain embodiments, the users of the applications 4 may create pre-copy executable object 10 and post-copy executable object 12 invoked by the requestor 8 to perform operations immediately before and after, respectively, the point-in-time copy operation is performed. The requestor 8 interfaces with the point-in-time copy service 14 and manages the creation of the point-in-time copy. The requestor 8 may notify the applications 4 of an operation to create the point-in-time backup initiated through the point-in-time copy service 14.

The point-in-time copy service 14 comprises the components that coordinate the creation of the point-in-time copy of the requested volumes 6a, 6b, 6c. The requestor 8 further creates one or more writers 16, which comprise components that provide a representation of one or more volumes 6a, 6b, 6c being copied and stores persistent information on the volumes that are involved in the point-in-time copy in the target volumes 7a, 7b, 7c. The writers 16 may comprise a database application. Point-in-time copy providers 18a, 18b, 18c are associated with one or more source volumes 6a, 6b, 6c and produce the target volumes 7a, 7b, 7c having the point-in-time copies. Thus, the providers 18a, 18b, 18c may create the point-in-time copy.

In one embodiment, the point-in-time copy, maintained as the target volumes 7a, 7b, 7c, may comprise a snapshot, logical copy or other virtual copy where the copy is created instantaneously after the copy data structures are created so that read and writes may continue to the copied volume after the instantaneous copy. The virtual copy comprises the data structures and information that represent the virtual copy, such as a Snapshot copy, FlashCopy®, etc. (FlashCopy is a registered trademark of International Business Machines Corp. in the United States and other countries), VSS copy, etc. A virtual copy comprises a point-in-time copy target volume 7a, 7b, 7c of a source volume 6a, 6b, 6c that is immediately created without copying the underlying data. The virtual copy 7a, 7b, 7c may include a bitmap representing each track or block in the source volume 6a, 6b, 6c subject to the virtual copy and whether the data has been updated since the point-in-time of the virtual copy. After the point-in-time the virtual copy was created, source data in the source volume 6a, 6b, 6c subject to the virtual copy is saved in the corresponding target volume 7a, 7b, 7c, such as the shadow copy, for the virtual copy before being overwritten. In this way volume data as of the point-in-time is maintained in the target volume 7a, 7b, 7c and changes to the source data after the point-in-time copy is created are stored in the corresponding target volume 7a, 7b, c7. A background copy operation may be initiated using the virtual copy to copy volume data at the point-in-time from the source volume 6a, 6b, 6c to the corresponding target volume 7a, 7b, 7c, to eventually create a clone after the virtual or shadow copy is created.

In certain embodiments, the point-in-time copy service 14 may comprise the Microsoft VSS copy service which creates the shadow volume 7a, 7b, 7c, which may comprise a clone, a copy-on-write (differential copy), and a redirect-on-write (differential copy). A clone is a full copy of the original data as it resides on the source volume 6a, 6b, 6c. The source volume 6a, 6b, 6c continues to take application changes while the corresponding shadow copy volume 7a, 7b, 7c remains an exact read-only copy of the original data at the point-in-time that it was created. A copy-on-write shadow copy volume 7a, 7b, 7c is a differential copy (rather than a full copy) of the original data as it resides on the corresponding source volume 6a, 6b, 6c. This method makes a copy of the original data before it is overwritten with new changes. Using the modified blocks and the unchanged blocks in the original source volume 6a, 6b, 6c, a shadow copy can be logically constructed that represents the shadow copy at the point-in-time it was created. A redirect-on-write shadow copy volume is a differential copy (rather than a full copy) of the original data as it resides on the source volume 6a, 6b, 6c. The redirect-on-write is similar to a copy-on-write, without the double write penalty, and it offers storage space and performance efficient snapshots. New writes to the original source volume 6a, 6b, 6c are redirected to the corresponding target volume 7a, 7b, c7 set aside for snapshot.

In certain embodiments, the point-in-time copy service 14 is provided by a third party software developer and the requestor 8 is provided by another software developer different than the third party software developer. In this way, the requestor 8 provides an interface to the applications 4 to allow them to invoke the point-in-time copy service 14 by a different software developer without having to develop the program components needed to interact with the point-in-time copy service 14. For instance, in one embodiment, the point-in-time copy service 14 may comprise the MICROSOFT® Volume Shadow Copy Services (VSS) and the requestor may comprise the VSS requestor component in the IBM® Tivoli® Storage Manager for Copy Services (CS) or the IBM Flash-Copy® Manager. (MICROSOFT is a trademark if Microsoft Corporation registered in many jurisdictions worldwide. IBM, Tivoli, and FlashCopy are trademarks of International Business Machines Corporation registered in many jurisdictions worldwide).

Yet further, the requestor 8 may be part of a backup architecture that provides management of backup copies in a backup management system, such as the Tivoli Storage Manager. In certain embodiments, the backup management system in which the requestor 8 is provided may also be used to manage the point-in-time copies created by the point-in-time copy service 14 offered by another software developer, different from the software developer offering the backup management system and the requestor 8.

The volumes 6a, 6b, 6c, 7a, 7b, 7c may be implemented in storage media in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, solid state disks (SSDs), flash disk, storage-class memory (SCM)), electronic memory, etc.

Figure 2:
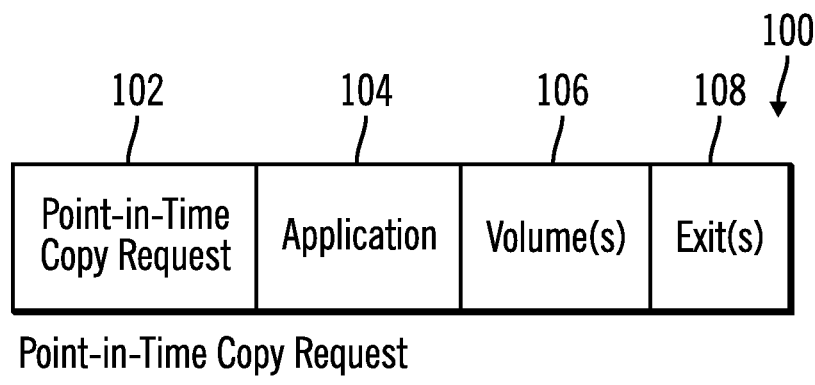
FIG. 2 illustrates an embodiment of a point-in-time copy request.

FIG. 2 illustrates an embodiment of a point-in-time copy request 100 invoked by the point-in-time requestor 8, including a point-in-time copy request 102 or command, indication of the application 104 invoking the request, indication of one or more volumes 106 to subject to the point-in-time copy operation, and indication of one or more exits 108.

Figure 3:
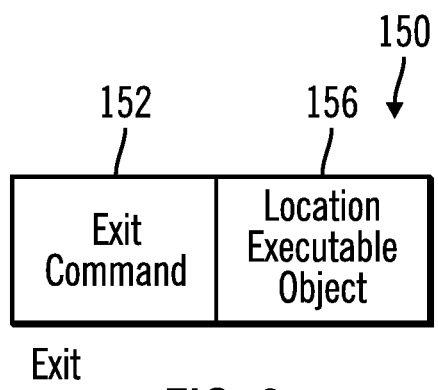
FIG. 3 illustrates an embodiment of an exit in the point-in-time copy request of FIG. 2.

FIG. 3 illustrates an embodiment of an exit 150 included in the request 100, which includes an exit command 152 for a type of exit, such as a PRE copy exit to be executed before the point-in-time copy is initiated and a POST copy exit to be executed after the point-in-time copy operation completes, and an exit location 156 that provides the location of the executable object 10, 12 that is to be executed as part of the exit command 150 to perform the exit related operations. The location 156 may comprise the command name of the executable object to invoke or a file or network path name where the object is located.

A PRE copy exit may provide a location 156 of a the pre-copy executable object 10 to perform operations to prepare the application 4 and the source volumes 6a, 6b, 6c used by the application 4 for a point-in-time copy, such as quiesce all writes to the source volume 6a, 6b, 6c, flush cached writes to the volumes 6a, 6b, 6c, etc. The POST copy exit provides the post-copy executable object 12 to perform operations to return the application 4 and its storage volumes 6a, 6b, 6c to a state where it is ready to perform read and write operations, such as unquiescing writes, etc. Additional exits 150 that are invoked at different execution points with respect to the point-in-time copy operation may also be provided to perform additional application operations related to the point-in-time copy request.

Figure 4A:
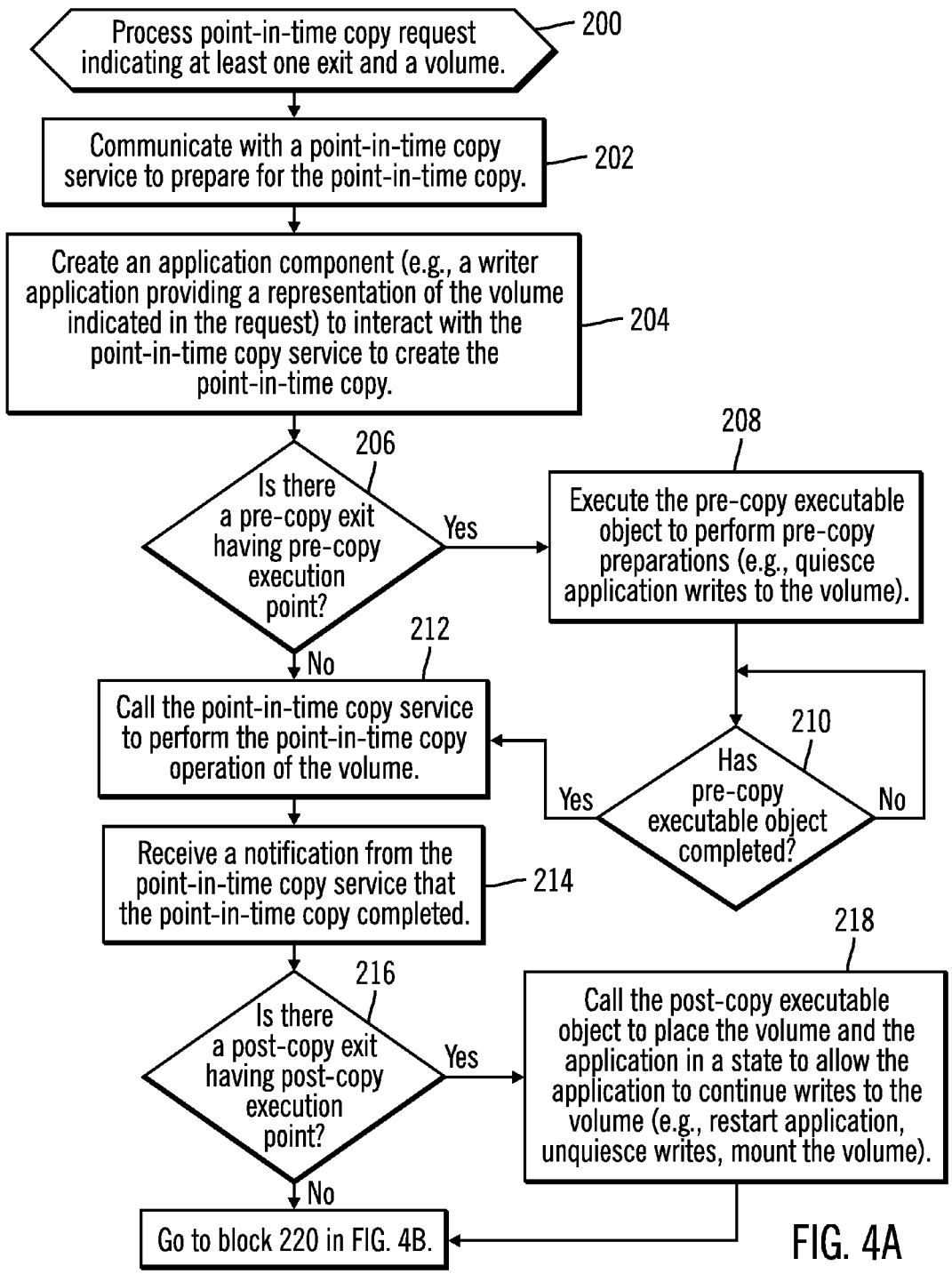
FIGS. 4a and 4b illustrate operations to interface an application with a point-in-time copy service.
Figure 4B:
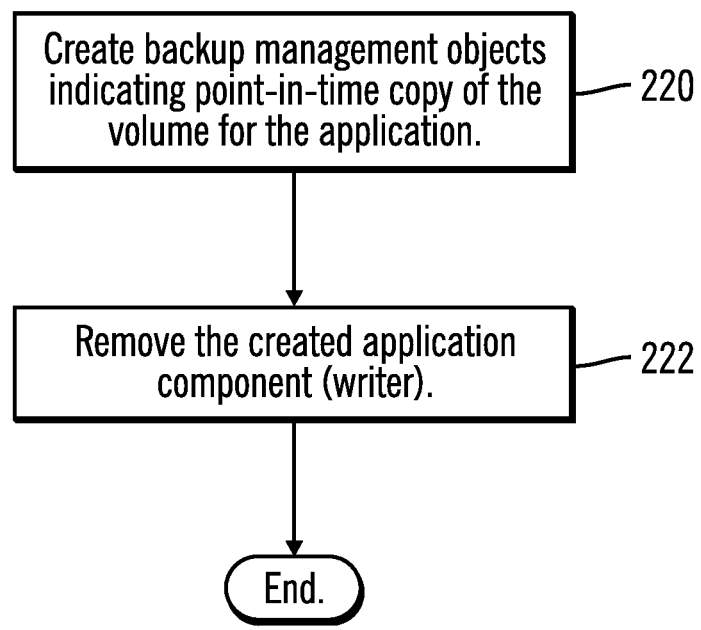

FIGS. 4a and 4b illustrate operations performed by the point-in-time requestor 8 to process a point-in-time copy request 100 from the application 4. With respect to FIG. 4a, the requestor 8 processes (at block 200) a point-in-time copy request 100 indicating at least one exit 108 and a volume 106. The point-in-time requestor 8 may communicate (at block 202) with a point-in-time copy service 14 to prepare for the point-in-time copy, such as to notify the application 4 of the point-in-time copy being made. The requestor 8 creates (at block 204) an application component to interact with the point-in-time copy service 14 to create the point-in-time copy of the indicated one or more volumes. In one embodiment, the application component may comprise a writer 16 providing a representation of the volume indicated in the request. In an alternative embodiment, the application component may comprise other components the copy service 14 needs to interact with in order to perform the point-in-time copy. If (at block 206) there is a PRE copy exit to be performed right before the point-in-time copy is created, then the requestor 8 calls/executes (at block 208) the pre-copy executable object 10 at the identified location 156 to perform pre-copy preparations (e.g., quiesce application 4 writes to the volume 6a, 6b, 6c, flush writes to the volume 6a, 6b, 6c, etc). At block 210, the requestor 8 waits until the pre-copy executable object 10 completes. If (from the no branch of block 206) there is no PRE copy exit or after (from the yes branch of block 210) the pre-copy executable object 10 completes, the requestor 8 calls (at block 212) the point-in-time copy service 14 to perform the point-in-time copy operation of the volume 6a, 6b, 6c.

Upon receiving (at block 214) a notification from the point-in-time copy service 14 that the point-in-time copy completed, the requestor 8 determines (at block 216) whether there is a POST copy exit 108. If so, the requestor 8 calls (at block 218) the post-copy executable object 12, as indicated in the exit location 156 of the POST copy exit 108, to place the volume 6a, 6b, 6c and the application 4 in a state where application reads and writes continue (e.g., restart application, unquiesce writes, etc). After processing the post-copy executable object 12 or if (from the no branch of block 216) there is no post-copy exit, then control proceeds to block 220 in FIG. 4b to create (at block 220) backup management objects indicating the point-in-time copy of the volume for the application. In one embodiment, the backup management objects may be created as part of a backup management system that provides the requestor 8 to interact with the point-in-time copy service offered by another software developer to create the point-in-time copies. The requestor 8 then removes (at block 222) the created application component, e.g., writer 16, created for the volumes 6a, 6b, 6c to interface with the point-in-time copy service 14 to create the one or more point-in-time copy volumes 7a, 7b, 7c.

Described embodiments provide a requestor to access a point-in-time copy service to make point-in-time copies on behalf of an application so the application vendor does not have to create all the necessary components, such as a writer 16, to utilize the point-in-time copy service. With the described embodiments, the application user/vendor need only create post and pre-copy exits to ready the application for a point-in-time copy and return the application to a state of normal operations after the copy. The requestor program then handles all the other details to interface with the point-in-time copy service to create point-in-time copies, which may be provided by a third party software developer, different form the software developer providing the requestor.

In certain embodiments, to facilitate integration and utilization of the point-in-time copy service, the described embodiments have the requestor enumerate the volumes 6a, 6b, 6c at the moment of point-in-time copy backup and then dynamically create a unique writer component 16 with a corresponding naming hierarchy to allow for each and every volume 6a, 6b, 6c used by the calling application 4 to be represented as a unique entity writer 16 component. In this way, the application user invoking the point-in-time copy service 14 through the requestor 8 need not develop the expertise to create the writer components or other components needed to invoke and run the point-in-time copy service 14.

Further, described embodiments provide for the incorporation of automatic exits to allow for application preparation prior to the point-in-time copy and application resumption after the snapshot. The exit points just prior to and just after the point-in-time copy place the application put into a consistent state. User exits are provided so that they can be adapted for the application specific environment. A user exit that is called at the precise time immediately prior to the point-in-time copy to quiesce the application data and another user exit that is called just after the snapshot minimize the freezing of application data to the application, thus mitigating the impact of the point-in-time copy backup.

Further, if the requestor is part of a backup architecture, such as the IBM Tivoli Storage Manager (TSM) architecture, which provides its own backup management system, then the user can exploit both backup management functions of the software developer providing the requestor, e.g., the IBM TSM architecture, and the point-in-time copy service of the other software developer, e.g., the Microsoft VSS copy service. The backup management features provided by the developer of the requestor may be used to manage the point-in-time copies created by the point-in-time service offered by another software developer. This provides for the automation and management of point-in-time copies running in the computing environment 2 supporting the point-in-time copy service 14.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4a and 4b show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The components of the computing environment 2, such as the application 4, requestor 8, point-in-time copy service 14, writers 16, and providers 18a, 18b, 18c may be implemented as one or more program modules in one or more computer systems, such as the computer system 302 shown in FIG. 5. Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system/server 302 is shown in the form of a general-purpose computing device. The components of computer system/server 302 may include, but are not limited to, one or more processors or processing units 304, a system memory 306, and a bus 308 that couples various system components including system memory 306 to processor 304. Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. The components 4, 8, 16, 18a, 18b, 18c of the computing environment 2 may be implemented as program modules 316 which generally carry out the functions and/or methodologies of embodiments of the invention as described herein. The components 4, 8, 16, 18a, 18b, 18c of the computing environment 2 may be implemented in one or more computer systems 302, where if they are implemented in multiple computer systems 302, then the computer systems may communicate over a network.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for creating a point-in-time copy of a volume in a storage used by an application by interacting with a point-in-time copy service, wherein a point-in-time copy comprises an instantaneous logical copy of data, wherein the computer program product comprises a non-transitory computer readable storage medium having computer readable program code embodied therein that executes to perform operations, the operations comprising:

processing a point-in-time copy request to perform a point-in-time copy operation with respect to the volume in the storage, wherein the request includes at least one exit, wherein the exit indicates when the exit is to be invoked with respect to the point-in-time copy operation and indicates a location of an executable object to execute when the exit is invoked;

in response to receiving the request, communicating with the point-in-time copy service to prepare for the point-in-time copy operation;

for each exit, determining from the exit when to invoke the exit, wherein the exit occurs before or after the point-in-time copy operation is performed;

executing the executable object for the exit to invoke to perform operations related to the point-in-time copy operation in response to invoking the exit, wherein the executable object performs operations before or after the point-in-time copy operation; and calling the point-in-time copy service to perform the point-in-time copy operation of the volume.

2. The computer program product of claim 1, wherein the at least one exit comprises a pre-copy exit identifying a pre-copy executable object to execute to perform operations to prepare the volume for the point-in-time copy operation, wherein the pre-copy exit is to be invoked immediately before calling the point-in-time copy service to perform the point-in-time copy operation, and wherein the point-in-time copy service is called to perform the point-in-time copy in response to completing the executing of the pre-copy executable object.

3. The computer program product of claim 2, wherein the pre-copy executable object quiesces writes from the application to the volume to place the data in a consistent state for the point-in-time copy and causes the application to quiesce writes while the point-in-time copy operation is created.

4. The computer program product of claim 1, wherein the at least one exit comprises a post-copy exit identifying a post-copy executable object to perform operations, wherein the post-copy exit is to be invoked immediately after the point-in-time copy operation completes, wherein the operations further comprise:

receiving a notification from the point-in-time copy service that the point-in-time copy operation completed; and executing the post-copy executable object in response to receiving the notification to place the volume and the application in a state to allow the application to continue writes to the volume.

5. The computer program product of claim 1, wherein the point-in-time copy comprises a volume level snapshot of the volume that requires completion of the snapshot within less than 10 seconds.

6. The computer program product of claim 1, wherein the operations further comprise:
   creating an application component to interact with the point-in-time copy service to create the point-in-time copy.

7. The computer program product of claim 6, wherein the application component comprises a writer application that provides a representation of the volume indicated in the request to the point-in-time copy service, wherein the writer application stores persistent information for the point-in-time copy of the volume.

8. The computer program product of claim 6, wherein the operations further comprise:
   receiving a notification from the point-in-time copy service that the point-in-time copy operation completed; and
   removing the created application components in response to receiving the notification.

9. The computer program product of claim 1, wherein the point-in-time copy service is provided by a third party software developer, and wherein the operations of processing the point-in-time copy request, communicating with the point-in-time copy service, executing the executable object, and calling the point-in-time copy service are performed by a requestor program provided by a software developer different than the third party software developer, wherein a user of the application creates the executable object and schedules the point-in-time copy request including the at least one exit to initiate the point-in-time copy request.

10. A system for creating a point-in-time copy of a volume in a storage used by an application by interacting with a point-in-time copy service, wherein a point-in-time copy comprises an instantaneous logical copy of data, comprising:
    a processing unit;
    a computer readable storage medium having code executed by the processing unit to perform operations, wherein the operations comprise:
       processing a point-in-time copy request to perform a point-in-time copy operation with respect to the volume in the storage, wherein the request includes at least one exit, wherein the exit indicates when the exit is to be invoked with respect to the point-in-time copy operation and indicates a location of an executable object to execute when the exit is invoked;
       in response to receiving the request, communicating with the point-in-time copy service to prepare for the point-in-time copy operation;
       for each exit, determining from the exit when to invoke the exit, wherein the exit occurs before or after the point-in-time copy operation is performed;
       executing the executable object for the exit to invoke to perform operations related to the point-in-time copy operation in response to invoking the exit, wherein the executable object performs operations before or after the point-in-time copy operation; and
       calling the point-in-time copy service to perform the point-in-time copy operation of the volume.

11. The system of claim 10, wherein the at least one exit comprises a pre-copy exit identifying a pre-copy executable object to execute to perform operations to prepare the volume for the point-in-time copy operation, wherein the pre-copy exit is to be invoked immediately before calling the point-in-time copy service to perform the point-in-time copy operation, and wherein the point-in-time copy service is called to perform the point-in-time copy in response to completing the executing of the pre-copy executable object.

12. The system of claim 10, wherein the at least one exit comprises a post-copy exit identifying a post-copy executable object to perform operations, wherein the post-copy exit is to be invoked immediately after the point-in-time copy operation completes, wherein the operations further comprise:
    receiving a notification from the point-in-time copy service that the point-in-time copy operation completed; and
    executing the post-copy executable object in response to receiving the notification to place the volume and the application in a state to allow the application to continue writes to the volume.

13. The system of claim 10, wherein the operations further comprise:
    creating an application component to interact with the point-in-time copy service to create the point-in-time copy.

14. The system of claim 10, wherein the point-in-time copy service is provided by a third party software developer, and wherein the operations of processing the point-in-time copy request, communicating with the point-in-time copy service, executing the executable object, and calling the point-in-time copy service are performed by a requestor program provided by a software developer different than the third party software developer, wherein a user of the application creates the executable object and schedules the point-in-time copy request including the at least one exit to initiate the point-in-time copy request.

15. A method for creating a point-in-time copy of a volume used by an application, wherein the point-in-time copy comprises an instantaneous logical copy of data, comprising:
    processing a point-in-time copy request to perform a point-in-time copy operation with respect to a volume of data in a storage, wherein the request includes at least one exit, wherein the exit indicates when the exit is to be invoked with respect to the point-in-time copy operation and indicates a location of an executable object to execute when the exit is invoked;
    in response to receiving the request, communicating with a point-in-time copy service to prepare for the point-in-time copy operation;
    for each exit, determining from the exit when to invoke the exit, wherein the exit occurs before or after the point-in-time copy operation is performed;
    executing the executable object for the exit to invoke to perform operations related to the point-in-time copy operation in response to invoking the exit, wherein the executable object performs operations before or after the point-in-time copy operation; and
    calling the point-in-time copy service to perform the point-in-time copy operation of the volume.

16. The method of claim 15, wherein the at least one exit comprises a pre-copy exit identifying a pre-copy executable object to execute to perform operations to prepare the volume for the point-in-time copy operation, wherein the pre-copy exit is to be invoked immediately before calling the point-in-time copy service to perform the point-in-time copy operation, and wherein the point-in-time copy service is called to perform the point-in-time copy in response to completing the executing of the pre-copy executable object.

17. The method of claim 16, wherein the pre-copy executable object quiesces writes from the application to the volume to place the data in a consistent state for the point-in-time copy and causes the application to quiesce writes while the point-in-time copy operation is created.

18. The method of claim 15, wherein the at least one exit comprises a post-copy exit identifying a post-copy executable object to perform operations, wherein the post-copy exit is to be invoked immediately after the point-in-time copy operation completes, further comprising:
   receiving a notification from the point-in-time copy service that the point-in-time copy operation completed; and
   executing the post-copy executable object in response to receiving the notification to place the volume and the application in a state to allow the application to continue writes to the volume.

19. The method of claim 15, further comprising:
   creating an application component to interact with the point-in-time copy service to create the point-in-time copy.

20. The method of claim 15, wherein the point-in-time copy service is provided by a third party software developer, and wherein the operations of processing the point-in-time copy request, communicating with the point-in-time copy service, executing the executable object, and calling the point-in-time copy service are performed by a requestor program provided by a software developer different than the third party software developer, wherein a user of the application creates the executable object and schedules the point-in-time copy request including the at least one exit to initiate the point-in-time copy request.

* * * * *